United States Patent [19]

Lee

[11] Patent Number: 5,838,513

[45] Date of Patent: Nov. 17, 1998

[54] CIRCUIT FOR DISCRIMINATING THE TAPE SPEED IN SPEED-CHANGE PLAYBACK MODE

[75] Inventor: Yong Hyun Lee, Seoul, Rep. of Korea

[73] Assignee: Samsung Electronics Co., Ltd., Kyungki-do, Rep. of Korea

[21] Appl. No.: 552,956

[22] Filed: Nov. 3, 1995

[30] Foreign Application Priority Data

Nov. 4, 1994 [KR] Rep. of Korea ...................... 94-28894

[51] Int. Cl.⁶ .................................................. G11B 15/46
[52] U.S. Cl. .................................. 360/73.07; 360/73.05; 360/73.14; 386/51
[58] Field of Search ............................... 360/73.01, 73.05, 360/73.07, 73.04, 73.14; 386/2, 47, 51, 67

[56] References Cited

U.S. PATENT DOCUMENTS

| | | |
|---|---|---|
| 4,063,284 | 12/1977 | Tatami . |
| 4,306,255 | 12/1981 | Misaki et al. ............................... 386/47 |
| 4,769,720 | 9/1988 | Heitmann ...................................... 386/2 |
| 5,225,749 | 7/1993 | Watanabe ................................. 318/268 |
| 5,384,642 | 1/1995 | Sim ............................................ 386/51 |
| 5,541,780 | 7/1996 | Han ........................................ 386/67 X |

FOREIGN PATENT DOCUMENTS 61-206953  9/1996  Japan ........................ 386/47

*Primary Examiner*—Aristotelis M. Psitos
*Assistant Examiner*—Larry T. Cullen
*Attorney, Agent, or Firm*—Sughrue, Mion, Zinn, Macpeak & Seas, PLLC

[57] ABSTRACT

A circuit discriminates the tape speed in a speed-change playback mode in a video processing system based upon the drop out signal derived from the video signal read off the tape. The circuit discerns differences between the pulse widths of the drop out signals of standard play (SP) and long play (LP) recorded video signals. The circuit has a low pass filter (51) connected in series with a comparator (53). The low pass filter (51) takes the drop out pulse signal from a pre-amplifier (10) or from a luminance/chroma processor and filters the drop out pulse signal to determine its DC level. The comparator compares the filtered DC level of the drop out pulse signal to a reference voltage, and based upon the comparison makes a determination whether the video signal on the tape is recorded at standard play speed or long play speed.

5 Claims, 4 Drawing Sheets

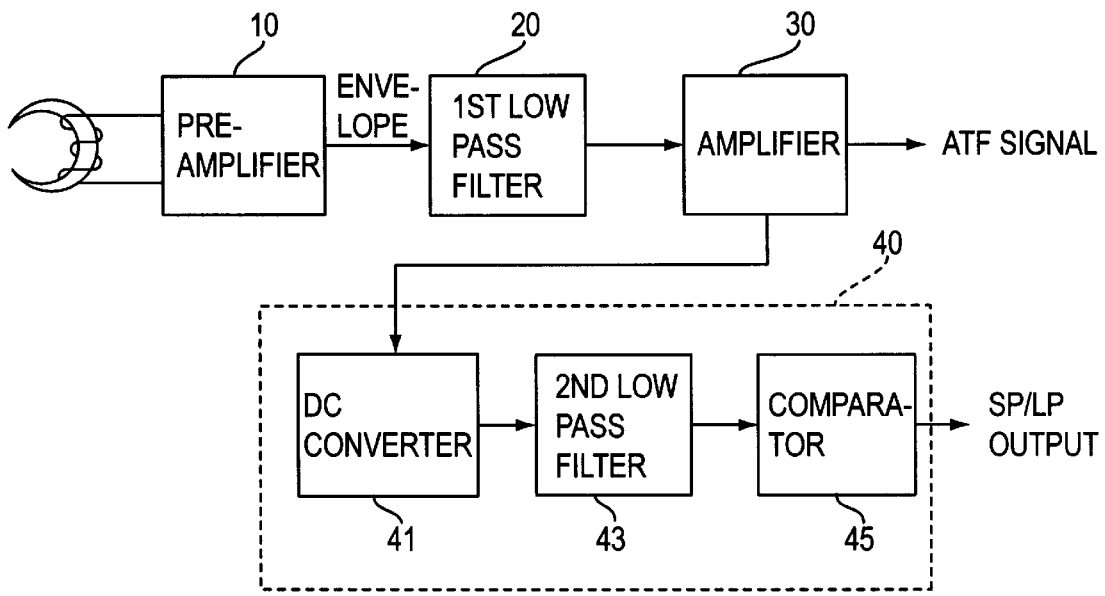
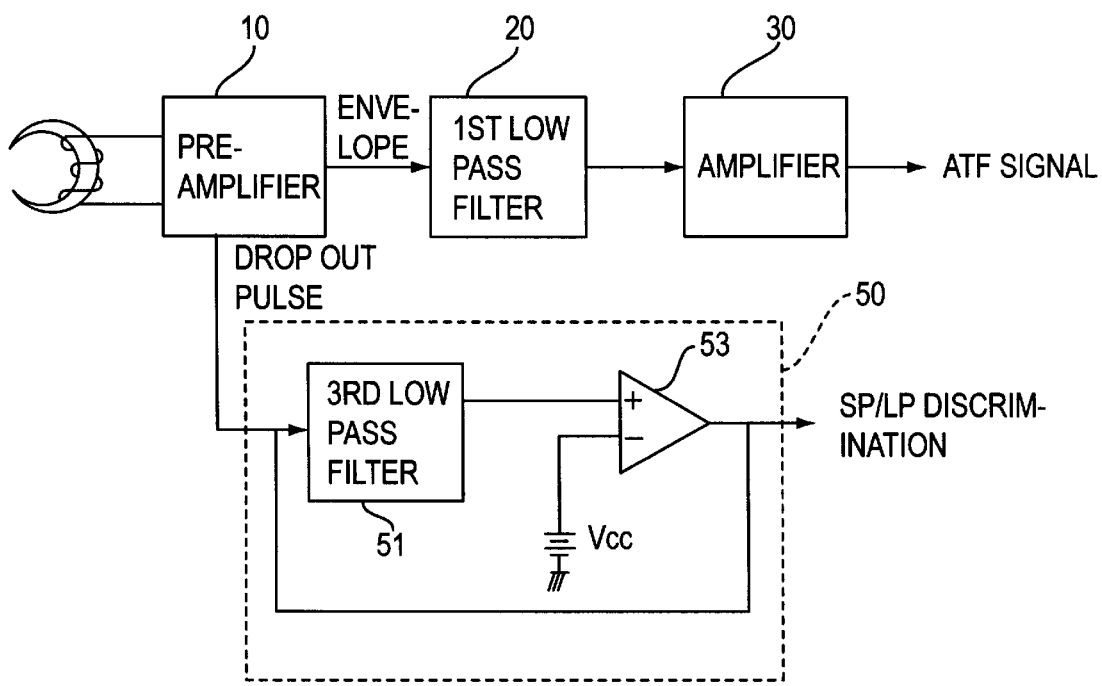

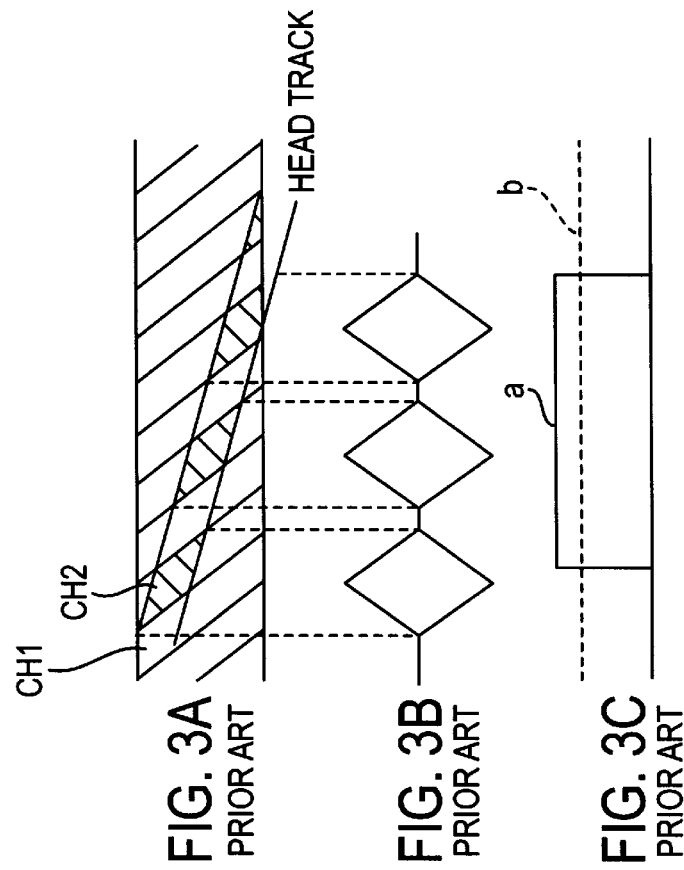
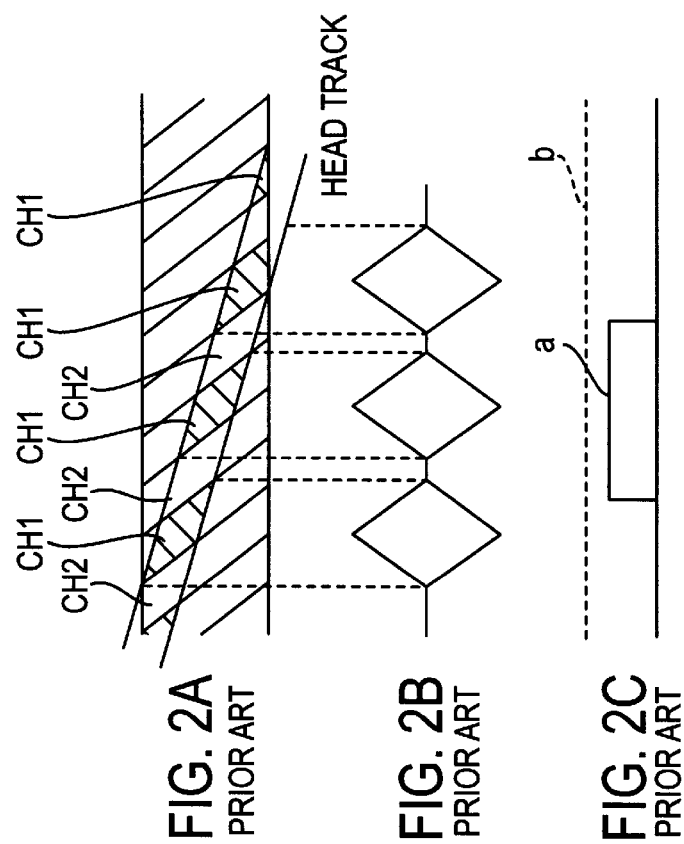

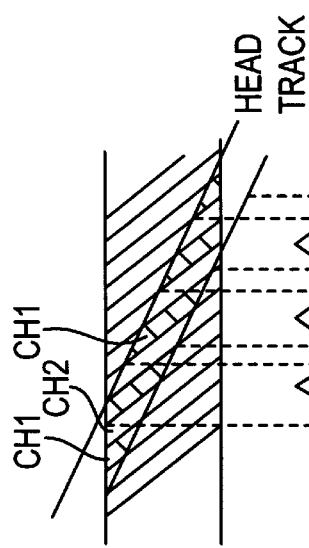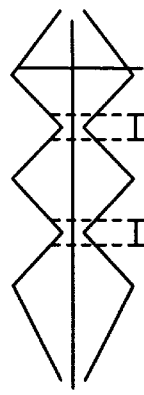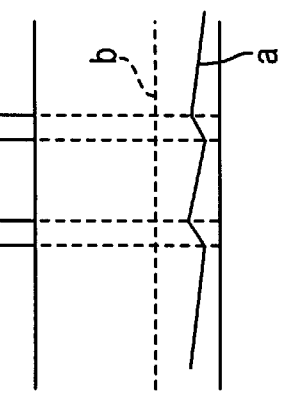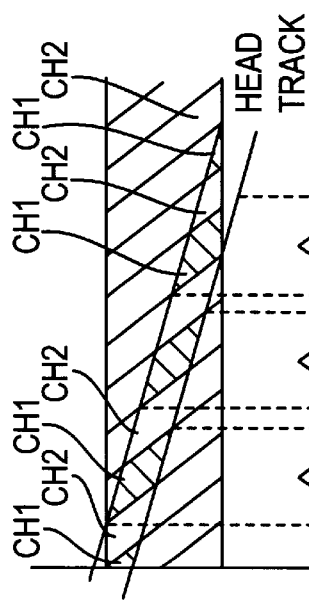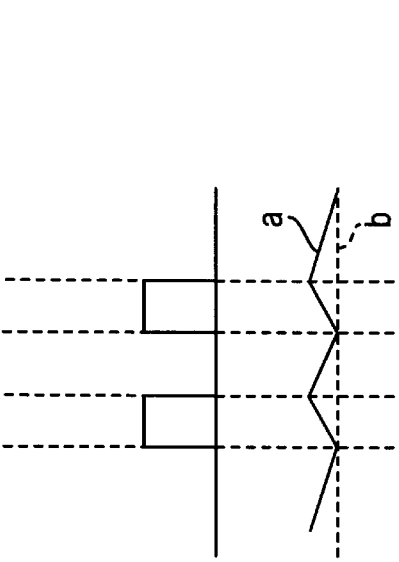

CIRCUIT FOR DISCRIMINATING THE TAPE SPEED IN SPEED-CHANGE PLAYBACK MODE

BACKGROUND OF THE INVENTION

1. Field of the Invention

The present invention relates in general to discriminating the tape speed in a speed-change playback mode, and more particularly to a circuit for discriminating the tape speed in the speed-change playback mode, which is capable of comparing a drop out pulse with a reference voltage and discriminating in accordance with the compared result whether the tape speed is standard play (referred to hereinafter as SP) or long play (referred to hereinafter as LP), the drop out pulse having different pulse widths according to the SP and LP.

2. Description of the Prior Art

Referring to FIG. 1, there is shown a block diagram of a conventional circuit for discriminating the speed of a tape in a speed-change playback mode. As shown in this drawing, the conventional tape speed discrimination circuit comprises a pre-amplifier 10, a low pass filter 20, an amplifier 30, and tape speed discrimination means 40.

The operation of the conventional tape speed discrimination circuit with the above-mentioned construction will hereinafter be described with reference to FIGS. 2A to 3C, which are waveform diagrams illustrating the operation of the conventional tape speed discrimination circuit.

First, assuming that the recording speed of the tape is SP, signals recorded on the tape are read as shown in FIG. 2A by a head moving on a plurality of tracks of the tape A signal read from a channel CH1 of the tape is amplified by the pre-amplifier 10 which provides an envelope signal as shown in FIG. 2B.

The low pass filter 20 acts to filter the envelope signal from the pre-amplifier 10 to detect an auto track finding (referred to hereinafter as ATF) signal of a frequency band of 100–200 KHz therefrom. The ATF signal is used to detect a trace position of the head to perform a tracking operation. The ATF signal detected by the low pass filter 20 is amplified by the amplifier 30 and then transmitted for the ATF operation.

The output signal from the amplifier 30 is also fed to the tape speed discrimination means 40. The tape speed discrimination means 40 acts to discriminate in response to the output signal from the amplifier 30 whether the tape speed is SP or LP. To this end, the tape speed discrimination means 40 includes a DC converter 41, a low pass filter 43 and a comparator 45. The DC converter 41 smoothes the output signal from the amplifier 30 and outputs the smoothed signal to the low pass filter 43. The low pass filter 43 removes a noise component from the output signal from the DC converter 41 and provides the resultant signal as indicated by the reference character in FIG. 2C.

The comparator 45 compares the output signal from the low pass filter 43 with a reference voltage as indicated by the reference character b in FIG. 2C. In the case where the recording speed of the tape is SP, the output signal from the low pass filter 43 is lower in level than the reference voltage. As a result, the comparator 45 outputs a low level signal indicating that the recording speed of the tape is SP.

Next, assuming that the recording speed of the tape is LP, as seen from FIG. 3A, a recording pattern when the recording speed of the tape is LP is different from that when the recording speed of the tape is SP. Namely, the track width in the LP recording pattern is ½ that in the SP recording pattern. Because the head is constant in width, the signal which is read from the channel CH1 of the LP recording pattern in the speed-change playback mode appears as an envelope signal as shown in FIG. 3B.

The DC converter 41 smoothes the envelope signal as shown in FIG. 3B and outputs the smoothed signal to the low pass filter 43. The low pass filter 43 removes a noise component from the output signal from the DC converter 41 and provides the resultant signal as indicated by the reference character a in FIG. 3C.

The comparator 45 compares the output signal from the low pass filter 43 with a reference voltage as indicated by the reference character b in FIG. 3C. In cases where the recording speed of the tape is LP, the output signal from the low pass filter 43 is higher in level than the reference voltage. As a result, the comparator 45 outputs a high level signal indicating that the recording speed of the tape is LP.

However, the above-mentioned conventional tape speed discrimination circuit has a disadvantage in that the envelope signal may be varied in gain according to the state and type of the tape, resulting in confusion in the tape speed discrimination. Further, the conventional tape speed discrimination circuit must comprise an additional DC converter, low pass filter and comparator, thereby increasing the cost.

SUMMARY OF THE INVENTION

Therefore, the present invention has been made in view of the above problems, and it is an object of the present invention to provide a circuit for discriminating the speed of a tape in a speed-change playback mode, which is capable of comparing a drop out pulse with a reference voltage and discriminating in accordance with the compared result whether the tape speed is SP or LP, the drop out pulse having different pulse widths according to the SP and LP, so that the tape speed can be accurately discriminated and the circuit construction can be simplified by using the drop out pulse.

In accordance with the present invention, the above and other objects can be accomplished by a provision of a circuit for discriminating the speed of a tape in a speed-change playback mode in a video processing system, comprising comparison means for comparing a drop out pulse with a reference voltage and discriminating in accordance with the compared result whether the tape speed is standard play or long play, the drop out pulse having different pulse widths according to the standard play and the long play.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram of a conventional circuit for discriminating the speed of a tape in a speed-change playback mode;

FIG. 2(A)–2(C) are timing diagrams illustrating the operation of the conventional tape speed discrimination circuit in FIG. 1 when the tape speed is SP, wherein:

FIG. 2A is a view showing a tape recording pattern and a head trace;

FIG. 2B is a waveform diagram of an envelope signal from a pre-amplifier; and

FIG. 2C is a waveform diagram of an input signal to a comparator;

FIGS. 3(A)–3(C) are timing diagrams illustrating the operation of the conventional tape speed discrimination circuit in FIG. 1 when the tape speed is LP, wherein:

FIG. 3A is a view showing a tape recording pattern and a head trace;

FIG. 3B is a waveform diagram of an envelope signal from the pre-amplifier; and

FIG. 3C is a waveform diagram of an input signal to the comparator;

FIG. 4 is a block diagram of a circuit for discriminating the speed of a tape in a speed-change playback mode in accordance with an embodiment of the present invention;

FIGS. 5(A)–5(E) are timing diagrams illustrating the operation of the tape speed discrimination circuit in FIG. 4 when the tape speed is SP, wherein:

FIG. 5A is a view showing a tape recording pattern and a head trace;

FIG. 5B is a waveform diagram of an envelope signal from a pre-amplifier;

FIG. 5C is a waveform diagram of a drop out pulse;

FIG. 5D is a waveform diagram of an output signal from a low pass filter; and

FIG. 5E is a waveform diagram of an output signal from a comparator; and

FIGS. 6(A)–6(F) are timing diagrams illustrating the operation of the tape speed discrimination circuit in FIG. 4 when the tape speed is SP, wherein:

FIG. 6A is a view showing a tape recording pattern and a head trace;

FIG. 6B is a waveform diagram of an envelope signal from the pre-amplifier;

FIG. 6C is a waveform diagram showing the result obtained by moving the envelop signal in FIG. 6B on the same time axis as that when the tape speed is SP;

FIG. 6D is a waveform diagram of a drop out pulse;

FIG. 6E is a waveform diagram of an output signal from the low pass filter;

FIG. 6F is a waveform diagram of an output signal from the comparator; and

DETAILED DESCRIPTION OF THE PREFERRED EMBODIMENTS

Figure 7:
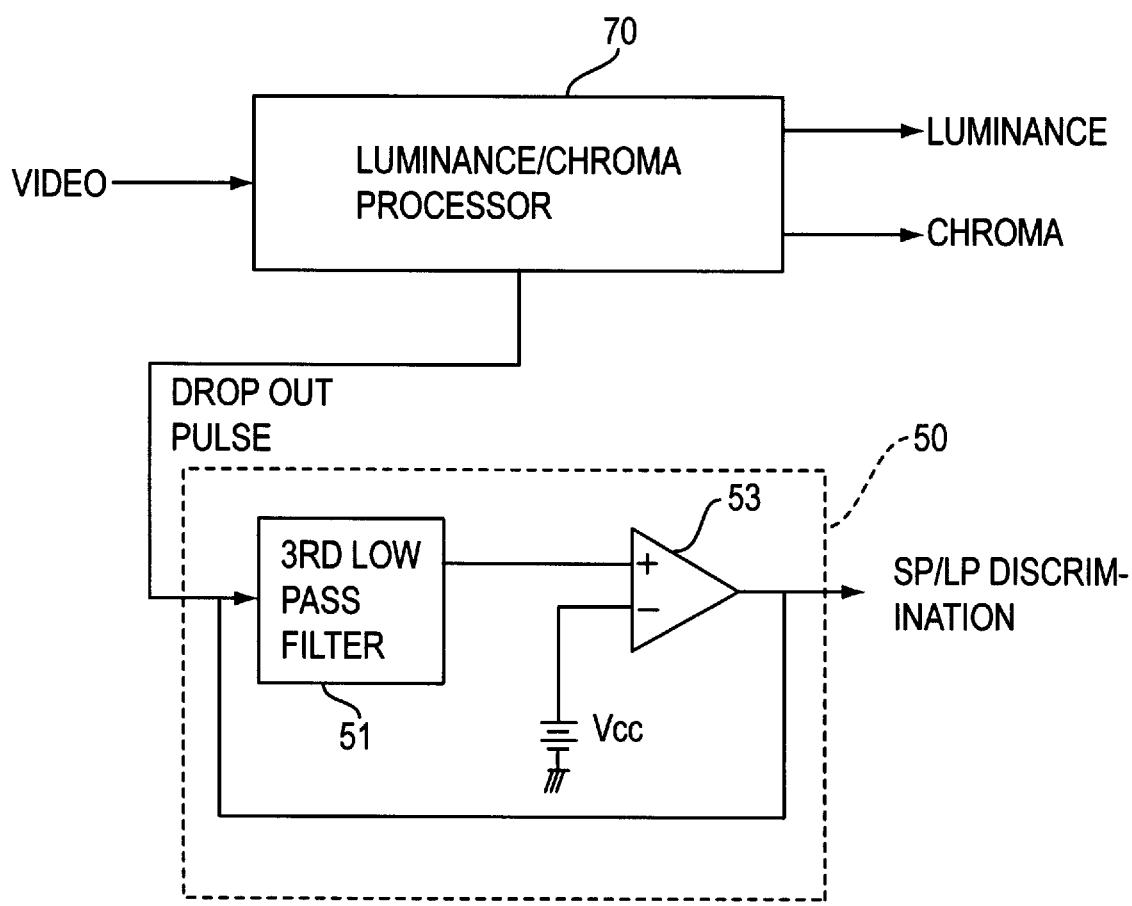
FIG. 7 is a block diagram of a circuit for discriminating the speed of a tape in a speed-changing playback mode in accordance with an alternate embodiment of the present invention.

Referring to FIG. 4, there is shown a block diagram of a circuit for discriminating the speed of a tape in a speed-change playback mode in accordance with an embodiment of the present invention. Some parts in this drawing are substantially the same as those in FIG. 1. Therefore, like reference numerals designate like parts.

As shown in FIG. 4, the tape speed discrimination circuit comprises the pre-amplifier 10, the low pass filter 20 and the amplifier 30. The pre-amplifier 10 acts to amplify a signal, read from the tape by a head, by a predetermined level. The low pass filter 20 is connected to the pre-amplifier 10 to filter an output signal therefrom. The amplifier 30 is connected to the low pass filter 20 to amplify an output signal therefrom. As a result of the amplification, the amplifier 30 provides a signal for the ATF operation in the speed-change playback mode.

The tape speed discrimination circuit further comprises tape speed discrimination means 50 connected to the pre-amplifier 10. The tape speed discrimination means 50 acts to discriminate the tape speed in response to a drop out pulse from the pre-amplifier 10.

The tape speed discrimination means 50 includes a low pass filter 51 for filtering the drop out pulse from the pre-amplifier 10 to convert it into a DC level, and a comparator 53 for comparing an output signal from the low pass filter 51 with a reference voltage to output a signal indicating that the tape speed is SP or LP.

The operation of the tape speed discrimination circuit with the above-mentioned construction in accordance with the embodiment of the present invention will hereinafter be described in detail with reference to FIGS. 5A to 6F, which are waveform diagrams Illustrating the operation of the tape speed discrimination circuit.

For the purpose of providing a better understanding of the description, the drop out pulse will first be mentioned.

FIG. 5A is a view showing a tape recording pattern and a head trace when the tape speed is SP, FIG. 5B is a waveform diagram of an envelope of a signal read from a channel CH1 of the tape, and FIG. 5C is a waveform diagram of the drop out pulse or a signal produced at a portion that no envelope is picked up in FIG. 5B.

FIGS. 6A to 6C are waveform diagrams corresponding to FIGS. 5A to 5C, respectively, when the tape speed is LP.

The drop out pulse has different pulse widths according to the SP and LP recording patterns, as will hereinafter be described in detail.

As seen from FIGS. 5A and 6A, a track width In the LP recording pattern is ½ that in the SP recording pattern. The head traverses a plurality of tracks of the tape in the speed-change playback mode. At this time, because the head is constant in width and the tracks in the SP and LP recording patterns are different in their widths from each other, signals which are read from the channels CH1 of the SP and LP recording patterns in the speed-change playback mode appear as envelope signals as shown in FIGS. 5B and 6B, respectively. The result shown in FIG. 6C is obtained by moving the envelope signal in FIG. 6B on the same time axis as that when the tape speed is SP.

Since the head is constant in width and the tracks in the SP and LP recording patterns are different in their widths from each other, portions in FIGS. 5B and 6C where no pulse Is picked up are different in their widths from each other. As mentioned above, the drop out pulse is a signal produced at a portion where no envelope is picked up. Hence, the drop out pulse is wider in width in the SP recording pattern, and it is narrower in width in the LP recording pattern.

Now, the operation of the tape speed discrimination circuit in the case where the tape speed is SP will hereinafter be mentioned with reference to FIGS. 4 and 5A–5E.

In the speed-change playback mode, the pre-amplifier 10 amplifies a signal read from the tape by 60 dB. As a result of the amplification, the pre-amplifier 10 provides its output signal as shown in FIG. 5B. As shown in FIG. 5C, the drop out pulse is produced at a portion that no envelope is picked up in FIG. 5B.

The low pass filter 51 filters the drop out pulse from the pre-amplifier 10 to extract a signal as indicated by the reference character a in FIG. 5D therefrom. The comparator 53 compares the output signal from the low pass filter 51 with a reference voltage as indicated by the reference character b in FIG. 5D. In this case, the output signal from the low pass filter 51 is higher in level than the reference voltage. As a result, the comparator 53 outputs a high level signal as shown in FIG. 5E indicating that the recording speed of the tape is SP.

Next, the operation of the tape speed discrimination circuit in the case where the tape speed is LP will hereinafter be mentioned with reference to FIGS. 4 and 6A–6F.

In the speed-change playback mode, the pre-amplifier 10 provides its output signal as shown in FIG. 6B. The result shown in FIG. 6C is obtained by moving the envelop signal in FIG. 6B on the same time axis as that when the tape speed is SP. As shown in FIG. 6D, the drop out pulse is produced at a portion that no envelope is picked up in FIG. 6C. At this time, the drop out pulse is narrower in width than that in the case where the tape speed is SP.

The low pass filter 51 filters the drop out pulse from the pre-amplifier 10 to extract a signal as indicated by the reference character a in FIG. 6E therefrom. The comparator 53 compares the output signal from the low pass filter 51 with a reference voltage as indicated by the reference character b in FIG. 6E. In this case, the output signal from the low pass filter 51 is lower in level than the reference voltage. As a result, the comparator 53 outputs a low level signal as shown in FIG. 6F indicating that the recording speed of the tape is LP. In this manner, it can be discriminated whether the tape speed is SP or LP.

As apparent from the above description, according to the present invention, the tape speed discrimination circuit is simple In construction. Therefore, the present invention has the effect of reducing the manufacturing cost.

As an alternate embodiment, the tape speed discrimination circuit according to the present invention may receive drop out pulses from a video luminance/chroma processor stage rather than from a preamplifier stage, the processor acting to separate the luminance and chroma signals from a composite video signal.

This alternate embodiment is shown in FIG. 7. The drop out pulse is received by the tape speed discrimination means 50 from the luminance/chroma processor 70. The functioning of the other elements shown are equivalent to those with the same numbers as described about with regard to FIG. 4.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A circuit for discriminating the speed of a tape in a speed-change playback mode in a video processing system, comprising:

filter means for filtering a drop out pulse signal; and comparison means for comparing the filtered drop out pulse signal with a reference voltage and discriminating in accordance with a result of the comparison whether the tape speed is standard play or long play, the drop out pulse signal having different pulse widths according to standard play and long play tape speeds.

2. A circuit for discriminating the speed of a tape in a speed-change playback mode in a video processing system, said circuit comprising:

a low pass filter receiving as an input a drop out pulse signal and producing a filtered output; and a comparator connected to said low pass filter so as to receive as a first input said filtered output, and connected to receive a reference voltage as a second input, said comparator producing an output indicative of tape speed.

3. The circuit for discriminating the speed of a tape in a speed-change playback mode in a video processing system, as set forth in claim 2, wherein said output indicative of tape speed has a high level when the speed of the tape is standard play and has a low level when the speed of the tape is long play.

4. The circuit for discriminating the speed of a tape in a speed-change playback mode in a video processing system, as set forth in claim 2, wherein said filtered output is a DC level of the drop out pulse signal.

5. A circuit for discriminating the speed of a tape in a speed-change playback mode in a video processing system, said circuit comprising:

extracting means for extracting a DC level from a drop out pulse signal; and comparator means for comparing said DC level with a reference voltage so as to discriminate whether the tape speed is standard play or long play.

\* \* \* \* \*